(12) United States Patent
Avins et al.

(10) Patent No.: US 7,938,243 B2
(45) Date of Patent: May 10, 2011

(54) THRUST WASHER TO TAKE TORQUE CONVERTER AXIAL LOADING

(75) Inventors: David Avins, Burbank, OH (US); Jean-Francois Heller, Strassburg (FR)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 337 days.

(21) Appl. No.: 11/473,663

(22) Filed: Jun. 23, 2006

(65) Prior Publication Data

US 2007/0029151 A1  Feb. 8, 2007

Related U.S. Application Data

(60) Provisional application No. 60/705,579, filed on Aug. 4, 2005.

(51) Int. Cl.
F16D 3/14 (2006.01)
F16D 3/66 (2006.01)

(52) U.S. Cl. .................. 192/204; 192/214; 464/68.6

(58) Field of Classification Search ........... 192/204; 464/68.1, 68.5, 68.6
See application file for complete search history.

(56) References Cited

U.S. PATENT DOCUMENTS

| | | |
|---|---|---|
| 4,117,677 A | 10/1978 | Murakami et al. |
| 4,233,203 A | 11/1980 | Baumgardt et al. |
| 4,257,229 A | 3/1981 | LaBuda |
| 4,289,220 A * | 9/1981 | Onuma et al. .......... 192/3.3 |
| 4,353,444 A * | 10/1982 | Bionaz ................ 192/3.29 |
| 5,025,904 A * | 6/1991 | Graton et al. .......... 192/201 |
| 5,168,702 A | 12/1992 | Sakakibara et al. |
| 5,240,458 A * | 8/1993 | Linglain et al. ........ 464/67.1 |
| 5,377,796 A | 1/1995 | Friedmann et al. |
| 5,575,364 A | 11/1996 | Friedmann et al. |
| 5,771,998 A | 6/1998 | Olsen et al. |
| 5,829,567 A * | 11/1998 | Ament ................. 192/70.17 |
| 6,231,309 B1 | 5/2001 | Popoola et al. |
| 6,494,303 B1 | 12/2002 | Reik et al. |
| 6,502,994 B2 | 1/2003 | Jackson |
| 6,520,685 B1 | 2/2003 | Urmaza |
| 7,083,029 B2 * | 8/2006 | Seebacher et al. ....... 192/3.29 |
| 2001/0033704 A1 | 10/2001 | Jackson |
| 2002/0027053 A1 * | 3/2002 | Back et al. ............ 192/3.3 |
| 2004/0211173 A1 | 10/2004 | Ono et al. |

FOREIGN PATENT DOCUMENTS

| | | |
|---|---|---|
| DE | 3424473 | 1/1985 |
| JP | 7310816 | 11/1995 |
| JP | 8028652 | 2/1996 |
| JP | 2003034732 | 7/2001 |
| JP | 2001323985 A | 11/2001 |
| JP | 2003138054 | 5/2003 |
| JP | 2004308855 | 11/2004 |
| RU | 1782786 | 12/1992 |

* cited by examiner

*Primary Examiner* — Rodney H Bonck
(74) *Attorney, Agent, or Firm* — Simpson & Simpson, PLLC

(57) ABSTRACT

The present invention broadly comprises a vibration damper assembly for a torque transmitting device. The assembly includes a thrust washer secured by first and second components of a vibration damper and a hub secured by the first and second components. The vibration damper, thrust washer, and hub are secured in a fixed position with respect to one another. In some aspects, the torque transmitting device comprises a longitudinal axis and the thrust washer comprises a hub segment having substantially a toroidal shape and at least one retainer segment extending outward, with respect to the axis, from the hub segment. At least a portion of the at least one retainer segment is disposed between the first and second components.

7 Claims, 5 Drawing Sheets

THRUST WASHER TO TAKE TORQUE CONVERTER AXIAL LOADING

FIELD OF THE INVENTION

This application claims the benefit under 35 U.S.C. §119 (e) of U.S. Provisional Application No. 60/705,579, filed Aug. 4, 2005.

The invention relates to improvements in apparatus for transmitting force between a rotary driving unit (such as the engine of a motor vehicle) and a rotary driven unit (such as the variable-speed transmission in the motor vehicle). In particular, the invention relates to a vibration damper assembly including a thrust washer and a hub.

BACKGROUND OF THE INVENTION

FIG. 1 is a cross-sectional view of a prior art torque converter. Turbine dampers are used in torque converters to dampen engine vibrations. For example, as shown in FIG. 1, torque converter 10 includes damper 12. During operation of converter 10, thrust 14 (acting right to left in FIG. 1) is generated on turbine cover 16. Cover 16 transfers the thrust to hub 18, which in turn transfers the thrust to hub 20. In general, hub 20 is in contact with cover 22, or thrust 14 causes hub 20 to contact cover 22. To prevent excessive wear between end 24 of hub 20 and cover 22, thrust washer 26 is disposed between end 24 and cover 22. Typically, washer 26 is constructed of a material having specified wear properties with respect to the materials of construction for hub 20 and cover 22.

In general, washer 26 floats axially with respect to damper 12 and hub 20 unless measures are taken. In some cases, washer 26 is pressed onto hub 20. Unfortunately, press fitting increases fabrication complexity and cost, as well as assembly time. In some cases torque converter 10 is modularly assembled. For example, damper 12 may be shipped separately for later assembly in converter 10. Unfortunately, press fitting requires additional equipment at the site of eventual assembly and thereby, as noted supra, increases complexity, cost, and time. In some cases, washer 26 slides onto hub 20 and additional assembly steps are required to restrain washer 26. For example, cover 22 is assembled to converter 10 to hold washer 26 in place. Unfortunately, the preceding arrangement can hamper modularity. For example, if damper 12 is to be shipped to another site for final assembly in converter 10, damper 12 and washer 26 cannot be preassembled. Instead, the parts must be shipped separately and then mated during final assembly, increasing the cost and complexity of the final assembly.

Hub 20 also can float longitudinally. For example, hub 20 is engaged with one or more splines in converter 10. Unfortunately, the normal and friction forces produced by the spline interfaces may fail to keep hub 20 from moving axially.

To minimize friction and wear between end 24 and washer 26, washer 26 should rotate synchronously with end 24. Unfortunately, in some cases, washer 26 also can float rotationally with respect to hub 20. To prevent this rotation, washer 26 can be pressed, as noted above, with the attendant problems also noted above. Other means (not shown), such as fastening washer 26 to end 24 using rivets, taps, etc. can be used. However, these measures can increase the cost and complexity of the parts and assembly associated with converter 12.

Thus, there is a long-felt need for a thrust washer in a torque converter damper that is easily installed and can be restrained axially and rotationally without press fitting or assembly of ancillary components of the torque converter. Further, there is a long-felt need for a simplified means of preventing axial movement of a hub in a damper for a torque converter. In addition, there is a long-felt need to increase the modularity of torque converter and torque converter damper assembly.

BRIEF SUMMARY OF THE INVENTION

The present invention broadly comprises a vibration damper assembly for a torque transmitting device. The assembly includes a thrust washer secured by first and second components of a vibration damper and a hub secured by the first and second components. The vibration damper, thrust washer, and hub are secured in a fixed position with respect to one another. In some aspects, the torque transmitting device comprises a longitudinal axis and the thrust washer comprises a hub segment having substantially a toroidal shape and at least one retainer segment extending outward, with respect to the axis, from the hub segment. At least a portion of the at least one retainer segment is disposed between the first and second components.

In some aspects, the hub comprises a first spline and the at least one retainer segment and the first spline are intermeshed. In some aspects, the hub comprises a second spline and at least one tooth in the second spline has first and second segments. The first and second segments have respective heights measured with respect to the axis. The respective height for the first segment is greater than the respective height for the second segment. At least a portion of the first segment is disposed between the first and second components. In some aspects, the first component is a cover plate and the second component is a flange.

The present invention also broadly comprises a thrust washer and a hub for a torque transmitting device. The thrust washer includes a hub segment, having substantially a toroidal shape, and at least one retainer segment. The at least one retainer segment extends from an outer circumference of the hub segment. In some aspects, the at least one retainer segment comprises a plurality of segments.

The hub includes a spline on an outer circumferential surface of the hub and, for at least one tooth in the spline, a raised segment. The raised segment has a first height and a remaining portion of the at least one tooth has a second height. The first and second heights are measured with respect to a longitudinal axis for the hub and the first height is greater than the second height. In some aspects, the hub comprises a longitudinal end and the raised segment is disposed proximate the end.

The present invention also broadly comprises a method for transmitting an axial load in a torque transmitting device.

It is a general object of the present invention to provide an assembly for transmitting an axial load in a torque transmitting device including a thrust washer to protect a hub for a torque converter from wear, while axially fixing the thrust washer using components of a damper for the torque converter.

It is another object of the present invention to provide an assembly for transmitting an axial load in a torque transmitting device that rotationally fixes a thrust washer to a hub for the torque converter.

It is yet another object of the present invention to provide an assembly for a torque transmitting device that axially fixes a hub for the torque converter using the components of the vibration damper.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 2:
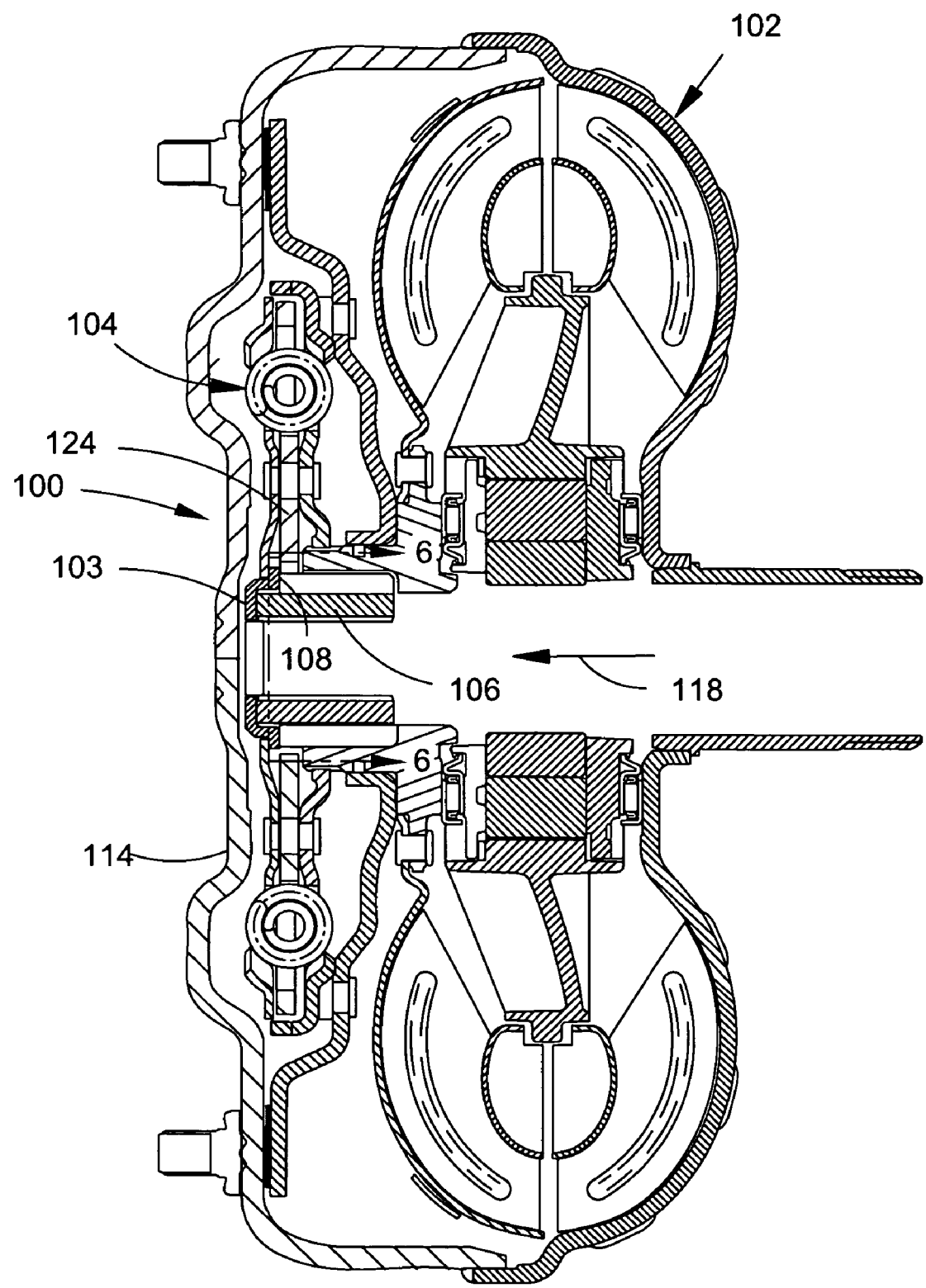
FIG. 2 is a cross-sectional view of a present invention vibration damper assembly in a torque converter.

FIG. 2 is a cross-sectional view of a present invention vibration damper assembly 100 in torque converter 102.

Figure 3:
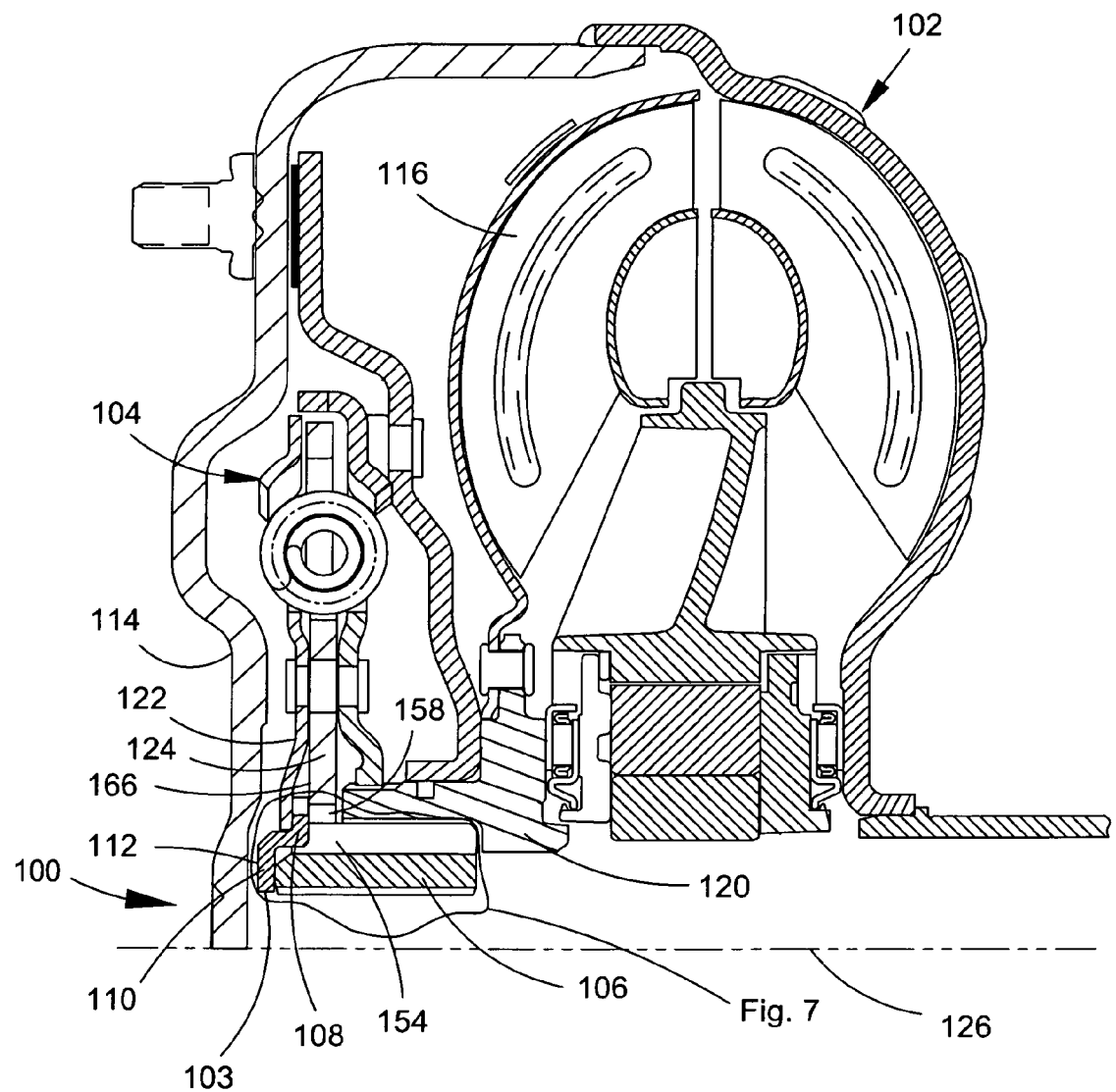
FIG. 3 is a partial view of FIG. 2.

FIG. 3 is a partial view of FIG. 2.

Figure 4:
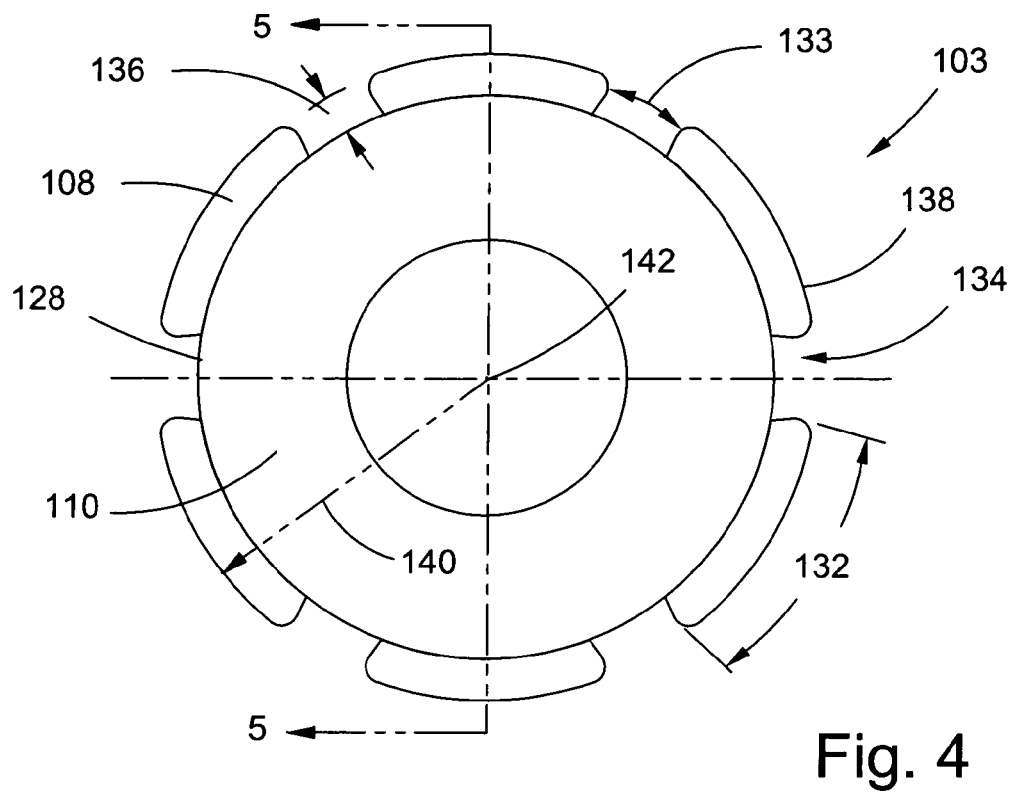
FIG. 4 is a front elevation view of a present invention thrust washer.

FIG. 4 is a front elevation view of present invention thrust washer 103.

Figure 5:
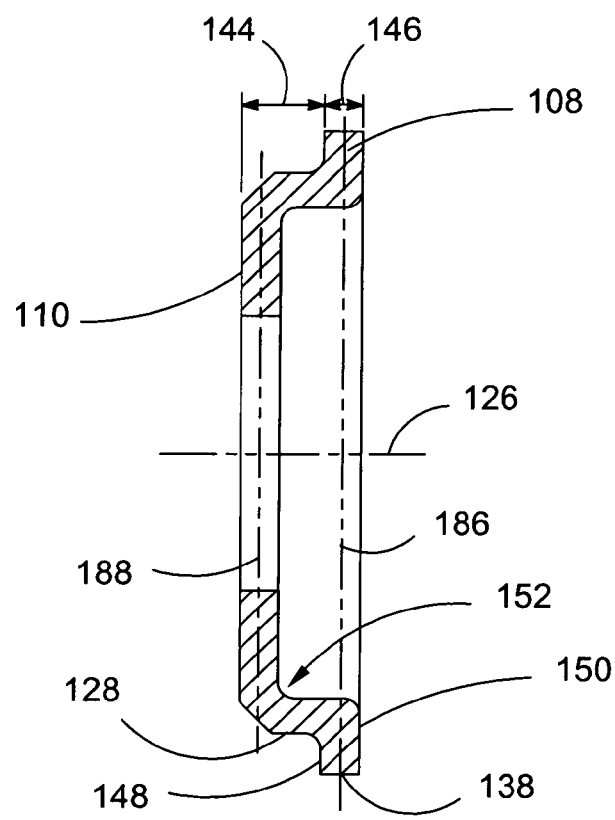
FIG. 5 is a cross-sectional view of the thrust washer in FIG. 4 along line 5-5 in FIG. 4.

FIG. 5 is a cross-sectional view of thrust washer 103 in FIG. 4 taken along line 5-5 in FIG. 4. The following should be viewed in light of FIGS. 2 through 5. Assembly 100 includes thrust washer 103, vibration damper 104, and hub 106. Washer 103 includes retainer segments 108 and hub segment 110. Hub segment 110 has substantially a washer shape. Hub segment 110 engages hub 106 and end 112 of hub segment 110 is arranged to contact cover 114 of converter 102. As described supra, torque from turbine 116 can result in an axial load 118 on hub 120, thrusting hub 106 toward cover 114. End 112 contacts cover 114 under axial load 118, preventing direct contact between hub 106 and cover 114.

Figure 1:
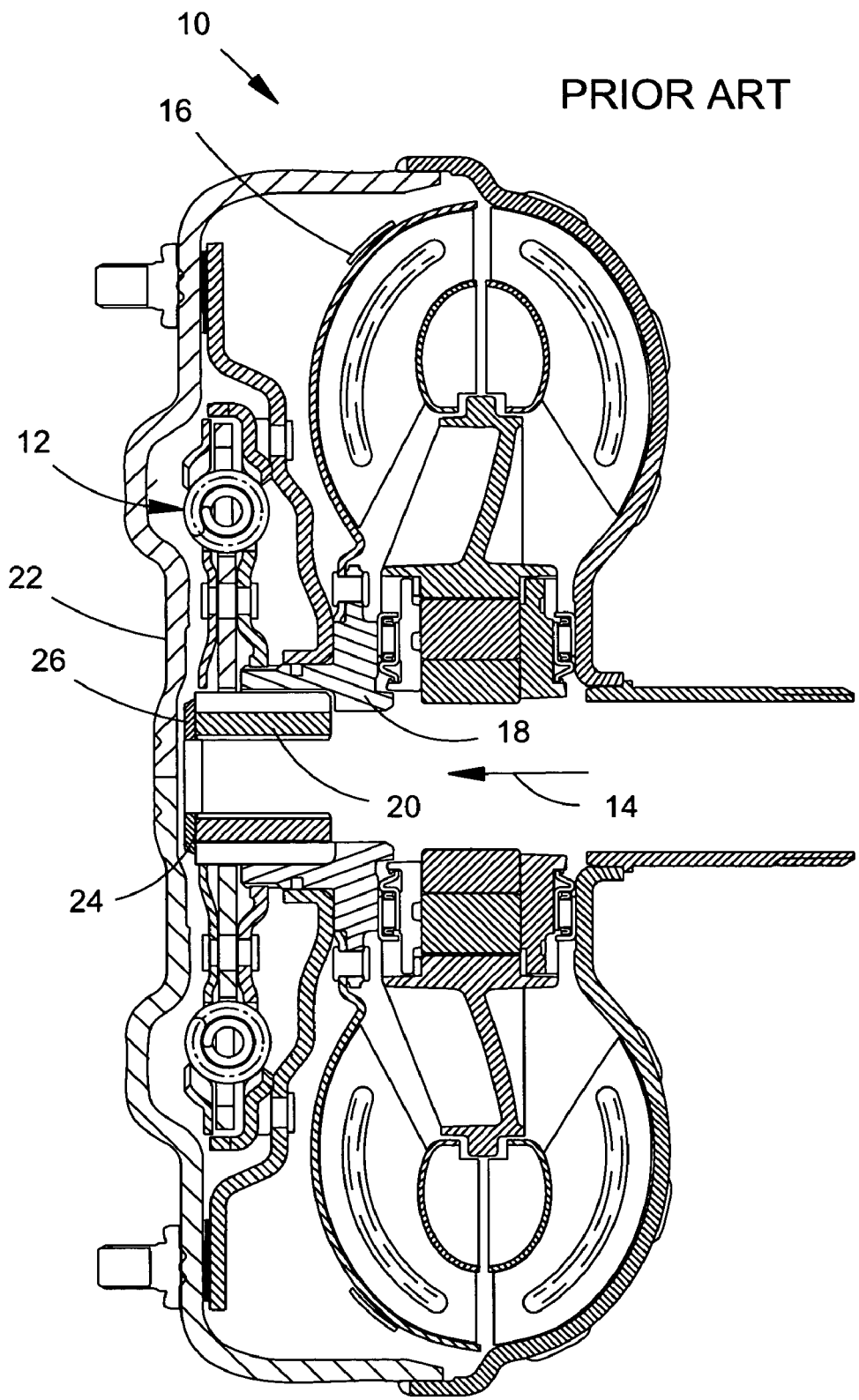
FIG. 1 is a cross-sectional view of a prior art torque converter.

In general, washer 103 is secured by components of damper 104 and segments 108 interface or engage with components of damper 104. Specifically, at least a portion of segments 108 engage at least one of cover plate 122 and flange 124 of damper 104. In this manner, washer 103 and damper 104 are kept in substantially a fixed position with respect to one another. That is, unlike the arrangement described supra for FIG. 1, washer 103 is held in place by damper 104 and does not require cover 114, press fitting, screws, rivets, etc. to maintain the same axial position with respect to damper 104. In some aspects, and as shown in FIGS. 2 and 3, segments 108 are captured, that is, disposed between cover plate 122 and flange 124. Thus, plate 122 and flange 124 maintain washer 103 in the above-mentioned fixed position.

Converter 102 includes longitudinal axis 126. In general, segments 108 are disposed along outer circumferential surface 128 of segment 110 and extend outward with respect to axis 126. In general, segments 108 and 110 are one monolithic piece, as shown in FIGS. 4 and 5. For example, washer 103 can be cast or molded as a single piece. Alternately stated, segments 108 are integral to segment 110 in FIGS. 4 and 5. Washer 103 can be made of any material known in the art, for example, phenolic or plenco.

Washer 103 is not limited to any particular number of segments 108. Although six segments 108 are shown in FIG. 4, it should be understood that other numbers of segments 108 are possible. In some aspects (not shown), washer 103 has a single segment 108. In some aspects, the single segment 108 is continuous about surface 128. That is, segment 108 forms a single, continuous piece encircling hub segment 110.

Washer 103 is not limited to any particular shape, configuration, or orientation of segments 108 and 110. In FIG. 4, widths 132 of segments 108 are equal and width 133 for slots 134 between segments 108 are equal in width. Further, lengths 136 of segments 108 are equal. That is, segments 108 are symmetrical with respect to hub section 110. However, it should be understood that other combinations of widths 132 and 133 and lengths 136 are possible, and such modifications are within the spirit and scope of the claims. In FIG. 4, edges 138 are at a same radial distance 140 from center point 142. However, it should be understood that other configurations of edges 138 are possible, and such modifications are within the spirit and scope of the claims. In general, thickness 144 and 146 are selected according to the specifications of converter 102 and damper 104. For example, thickness 146 can be selected for a proper fit between plate 122 and flange 124 and thickness 144 can be selected according to the configuration of hub 106 and the expected reaction of hub 106 under axial load 118.

Surface 148 and 150 of segments 108 engage damper 104. In some aspects, surfaces 148 and 150 are orthogonal to axis 126. In some aspects, surfaces 148 and 150 are otherwise parallel. However, it should be understood that other configurations of surfaces 148 and 150 are possible. For example, plate 122 and flange 124 may be in a non-parallel configuration at the areas of engagement with segments 108, and surfaces 148 and 150 can be configured to mirror this non-parallel configuration. In some aspects, surface 152 is configured to conform to hub 106.

Figure 6:
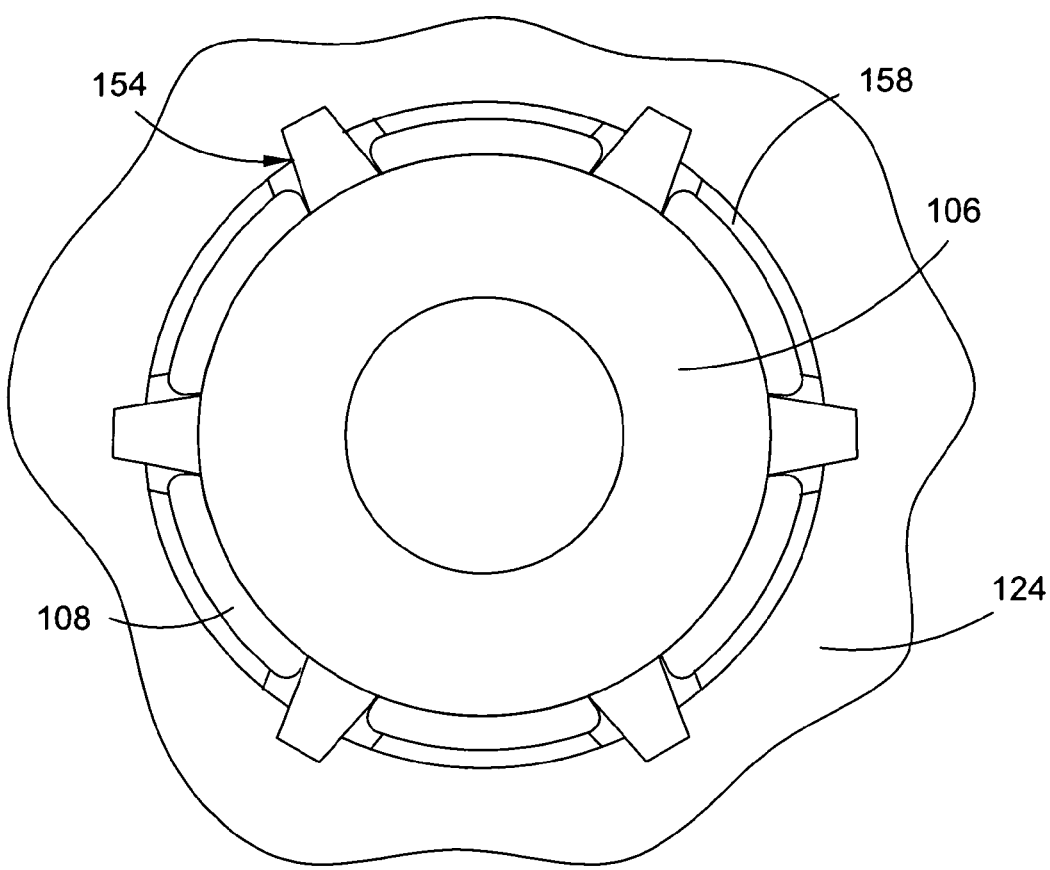
FIG. 6 is a partial front elevation along line 6-6 in FIG. 2.

FIG. 6 is a partial front elevation along line 6-6 in FIG. 2.

Figure 7:
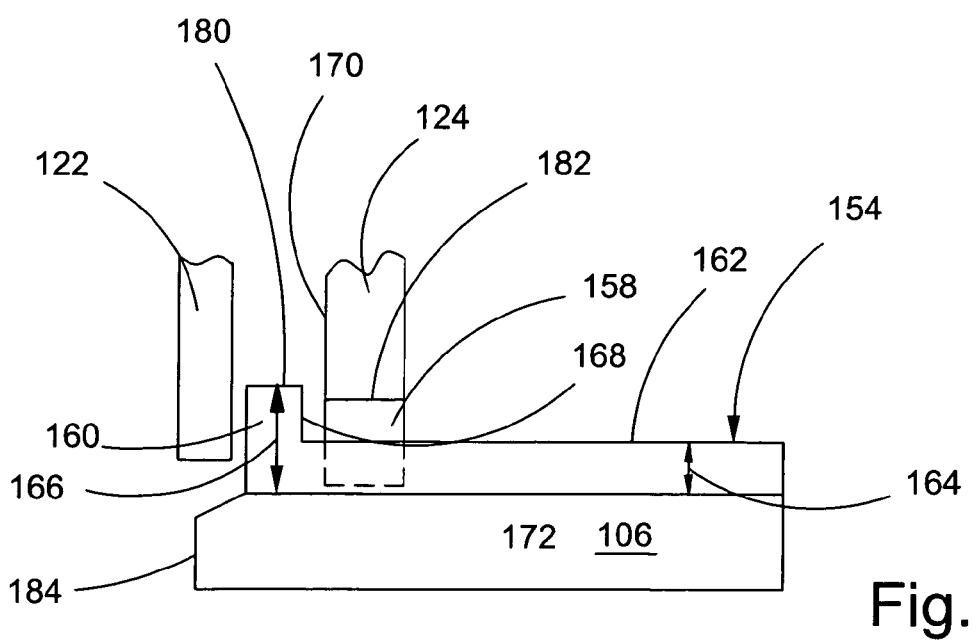
FIG. 7 is a detail from FIG. 3 with the thrust washer removed from view.

FIG. 7 is a detail from FIG. 3 with the thrust washer removed from view. To clarify the visual presentation of FIG. 7, gaps between elements shown in FIG. 7 have been exaggerated or provided. The following should be viewed in light of FIGS. 2 through 7. In general, hub 106 includes spline or teeth 154 used to mate hub 106 with other components of converter 102. For example, spline 154 is interleaved with a spline (not visible in FIG. 6) for hub 120 and spline or teeth 158 of flange 124. In some aspects, washer 103, and in particular, segments 108, are matingly engaged with hub 106.

Thus, segments 108 form a spline that is interleaved with spline 154, causing washer 103 to rotate with hub 106. This arrangement advantageously prevents washer 103 from rubbing against end 184. That is, the frictional force on washer 103 from axial load 118 is substantially directed to end 184. In some aspects, spline 154 and segments 108 are tightly interleaved. That is, there is a relatively small gap between spline 154 and respective segments 108. In other aspects, the preceding gap is larger, resulting in lash for the combination of spline 154 and segments 108. In some aspects, the number of teeth 154 equals the number of slots 134. However, it should be understood that other sizes, configurations, and numbers of teeth 154 are possible and that such modifications are within the spirit and scope of the claims. For example, the number of teeth 154 could be less than the number of slots 134.

In some aspects, spline 154, specifically, raised segment 160, is configured to maintain hub 106 in a fixed position with respect to damper 104. That is, spline 154 and segment 160 hold hub 106 in a fixed position. At least one tooth 154 includes raised segment 160. This at least one tooth also includes segment 162. Segments 162 and 160 have heights 164 and 166, respectively. Height 166 is greater than height 164. Height 166 is selected so that when hub 106 and flange 124 are engaged, surface 168 engages surface 170. That is, top 180 of segment 160 extends (in a radial distance from axis 126) beyond the root 182 of tooth 158. The axial position of segment 160 is at least partially determined by the configuration of damper 104. That is, segment 160 is positioned to engage components of damper 104 as described supra. However, it should be understood that segment 160 can have other configurations with respect to hub 106, and such configurations are within the spirit and scope of the claims.

Returning to FIG. 5, in general, segments 108 and segment 110 are characterized by planes 186 and 188, respectively, orthogonal to axis 126. In some aspects, these planes are off-set, for example, as shown in FIG. 5. In some aspects (not shown), the planes are coincident. In general, for the orientation of converter 102 in FIG. 2, plane 186 is located to the transmission (not shown) side of segment 110, as shown in FIG. 5. However, it should be understood that washer 103 is not limited to the configuration shown in FIG. 5 and that other configurations are within the spirit and scope of the claims. The configuration of planes 186 and 188 is at least partially determined by the orientation of other components in the converter. For example, since hub 106 extends (to the left) beyond damper 104, plane 186 is disposed to the right of plane 188 to enable segment 110 to cover hub 106 and to enable segments 108 to engage cover 122 and flange 124.

Thrust washer 103 and hub 106 are not limited to the torque converter and damper arrangement shown in FIG. 2. It should be understood that thrust washer 103 and hub 106 can be used in torque converters and dampers having configurations other than those shown in the figures above and that such modifications are within the spirit and scope of the claims.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A vibration damper assembly for a torque converter, comprising:
   a hub;
   a vibration damper including:
      a cover plate;
      a flange; and,
      a plurality of springs rotationally connecting the cover plate and the flange; and,
   a thrust washer including:
      a first portion axially disposed between the cover plate and the flange and axially restrained by contact with the cover plate and the flange; and,
      a second portion axially aligned with an axis of rotation for the vibration damper and adapted to contact a torque transmitting cover for the torque converter, wherein the hub is held in a fixed axial position with respect to said cover plate and said flange by contact between said hub and said cover plate and said flange.

2. The assembly of claim 1 wherein said vibration damper, said thrust washer, and said hub are secured in a fixed position with respect to one another.

3. The assembly of claim 2 wherein said torque converter comprises a longitudinal axis and wherein said vibration damper, said thrust washer, and said hub maintain said fixed position when at least one of said damper, washer, and hub are moved parallel to said axis.

4. The assembly of claim 1 wherein said torque converter comprises a longitudinal axis and said thrust washer comprises a hub segment having substantially a toroidal shape and at least one retainer segment extending outward, with respect to said axis, from said hub segment; and,
   wherein at least a portion of said at least one retainer segment is disposed between said cover and said flange.

5. The assembly of claim 4 wherein said hub comprises a first spline and said at least one retainer segment and said first spline are intermeshed.

6. The assembly of claim 1 wherein said torque converter comprises a longitudinal axis and said hub comprises a spline and at least one tooth in said spline has first and second segments, where said first and second segments have respective heights measured with respect to said axis, and wherein said respective height for said first segment is greater than said respective height for said second segment.

7. The assembly of claim 6 wherein at least a portion of said first segment is disposed between said cover and said flange.

* * * * *